May 1, 1928.

L. I. ANDREW 1,668,301

CULTIVATOR

Filed Sept. 30, 1926

Inventor
Lyman I. Andrew,
By Lacey & Lacey, Attorneys

May 1, 1928.  
L. I. ANDREW  
CULTIVATOR  
Filed Sept. 30, 1926
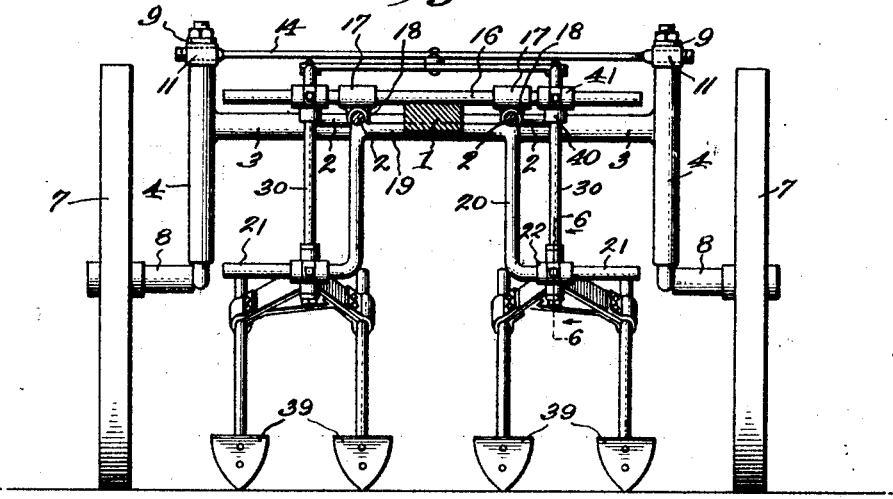

Patented May 1, 1928.

1,668,301

UNITED STATES PATENT OFFICE.

LYMAN I. ANDREW, OF GRAND RIVER, IOWA.

CULTIVATOR.

Application filed September 30, 1926. Serial No. 138,737.

This invention relates to cultivators and has for its object the provision of a simple and efficient mechanism whereby the shifting of the cultivator shovels or blades will operate automatically to shift the carrying wheels of the machine so that the parts will be returned to the proper relation to the growing plants. Other objects of the invention are to provide means whereby the movement of the wheels and the cultivators at the opposite sides will be equal and synchronous, to provide means whereby the cultivator blades may be set at a distance apart corresponding to the width of the rows, and to provide means whereby the cultivators may be raised or lowered as desired. Other objects of the invention will appear in the course of the following description, and the invention resides in certain novel features which will be particularly pointed out in the appended claims.

In the drawings:

Fig. 3 is a sectional front elevation, the section being taken on the line 3—3 of Fig. 2;

Fig. 4 is an enlarged detail section on the line 4—4 of Fig. 1;

Fig. 5 is an enlarged detail section on the line 5—5 of Fig. 2;

Fig. 6 is an enlarged detail section on the line 6—6 of Fig. 3, and

Figs. 7 and 8 are details.

Figure 1:
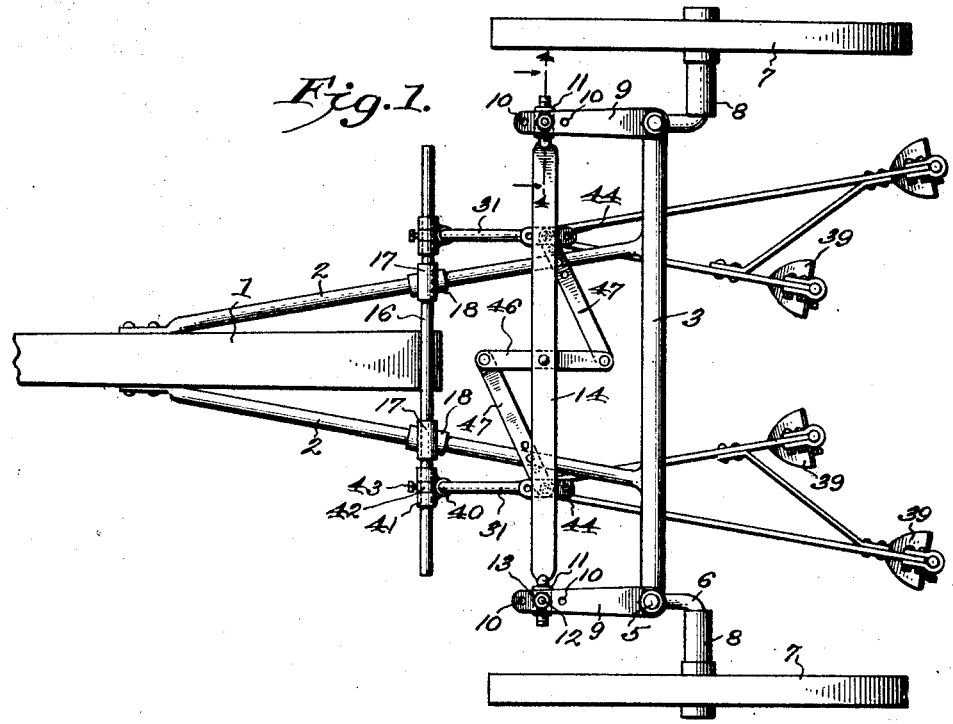
Figure 1 is a plan view of so much of a cultivator frame and the cultivators carried thereby as is necessary to a disclosure of the invention.
Figure 2:
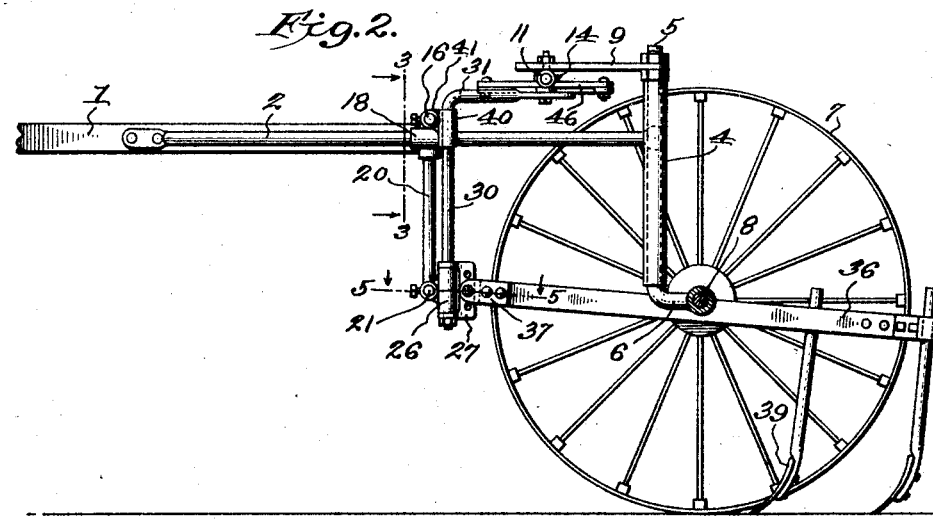
Fig. 2 is a side elevation with the near ground wheel removed and the spindle carrying the near wheel in vertical section.

In the drawings, the reference numeral 1 indicates a draft tongue which may be of any preferred form and size and to the sides of which are secured the front ends of rearwardly diverging braces 2, the said braces having their rear ends formed integral with or rigidly secured to a cross bar or beam 3 carrying vertical sleeves 4 at its ends. Rotatably fitted through the said sleeves 4 are spindles 5 having their lower ends turned rearwardly and then outwardly, as indicated at 6, to constitute stub spindles or axles on which the ground wheels 7 are rotatably mounted. The said wheels 7 may be held upon the axles by any approved means and spacing sleeves 8 are shown between the inner ends of the hubs of the wheels and the bent portion or crank of the axle so that inward movement of the wheels will be prevented. The upper ends of the spindles 5 project above the sleeves 4 and to the projecting extremities of the spindles are secured steering arms 9 which project forwardly and are provided in their front end portions with longitudinal series of openings 10, as shown in Fig. 1. Disposed below the front end portion of each steering arm 9 is a sleeve 11 having an internally threaded bore and provided between its ends with an upstanding threaded stud 12 insertable through any one of the openings 10 and held therein by a nut 13, as shown most clearly in Fig. 4, the stud fitting in the opening 10 loosely enough to permit relative pivotal movement of the steering arm but at the same time closely enough to impart movement to the arm without damage to the threads of the stud. Extending between the two sleeves 11 is a coupling bar 14 which is preferably flattened between its ends and at its ends is formed into screws or threaded studs 15 engageable in the bores of the sleeves 11. By rotating the bar in the bores of the sleeves, the steering arms 9 may be set at any desired angle so that the normal position of the ground wheels may be adjusted according to the desires of the user or the necessities of any particular circumstances, this adjustment being particularly advantageous when the machine is to be used on a hillside. It will be understood that, if lateral movement be imparted to the coupling bar 14, the steering arms 9 will be simultaneously swung in the same direction as the coupling bar so that the ground wheels 7 will be shifted into angular relation to the draft pole 1 and the machine thereby steered into the proper position relative to the row of plants being cultivated. The shifting of the ground wheels follows from the shifting of the steering arms inasmuch as the said arms are rigidly secured to the upper ends of the spindles 5 upon the lower ends of which the ground wheels are carried.

Resting upon the rear end of the draft bar 1 is a transverse frame bar 16 which is preferably tubular or circular in cross section and engaged about the said frame bar are coupling sleeves 17 each of which is formed integral with the upper side of an intersecting sleeve 18 fitting around the subjacent brace 2 whereby the frame bar 16 will be supported upon the braces. Secured to the under side of the draft tongue 1 at the rear end thereof and welded or otherwise rigidly secured to the sleeves 18 is the shoulder member 19 of an arch 20 from the lower ends of which extend horizontal spindles 21, and fitted upon the said horizontal spindles are sleeves 22 which may be adjusted endwise upon the said spindles and are slotted between their ends, as indicated at 23, whereby a stop collar 24 may be fitted about the spindle between the ends of a sleeve and secured by a set screw 25 to hold the sleeve in a set place while permitting pivotal movement of the sleeve about the spindle. The sleeve 22 is provided on its rear side with a hub member 26 which is normally disposed vertically and is adapted to fit between the upper and lower ends of a clevis 27. The clevis has angular openings 28 through its ends to receive the angular tapered lower end portion 29 of the vertical shank 30 of a rocking arm 31, the said tapered portion 29 of the shank 30 extending through the angular opening in the lower end of the clevis 27 so that any lateral movement of the clevis will be imparted to the shank 30. Immediately above the angular portion 29, the shank 30 has a portion 29′ of circular cross section passing through and rotatable in the hub member 26, said portion 29′ being of less diameter than the main portion of the shank. Between the main portion of the shank and the portion 29′ is an upper angular portion 30′ fitting in the angular opening in the upper end of the clevis. To prevent withdrawl of the shank 30 and its tapered portion 29 from the clevis, the shank terminates in a short threaded stud 32 upon which a nut 33 is mounted to be turned home against the lower end of the clevis and thereby clamp the latter to the turning member. The clevis extends rearwardly from the shank 30 and has a flat-sided fin 34 provided with openings 35 therethrough and the cultivator beams 36 are attached to the said fin 34 by coupling plates 37 disposed against the opposite sides of the respective cultivator beams at the front ends thereof and clamped thereto, the front extremities of the coupling plates receiving between them the fin 34 and being pivotally attached thereto by a bolt 38 inserted through one of the openings 35. The cultivator beams may be thus adjusted vertically so as to cause the shovels or blades 39 to run at the desired depth and are also capable of a vertical pivotal movement so that when desired the shovels may be raised from the ground to an inoperative position. The upper portion of the shank 30 is rotatably engaged through a vertical sleeve 40 which is alined axially with the hub 26 and formed with a divided sleeve 41, corresponding in all respects to the sleeve 22 and fitted upon the frame bar 16 to be held thereon by a stop collar 42 and a set bolt 43 corresponding in all respects to the collar 24 and set bolt 25.

The turning arms 31 are preferably formed integral with the upper ends of the shanks 30 and project rearwardly therefrom, the rear extremities of the said arms being flattened and provided with openings 44 therethrough. Pivotally attached to the coupling bar 14 at the center of the same is a lever 46 which extends normally at a right angle to the coupling bar and an equal distance in front and rear of the same. To the ends of the said lever are pivoted the links 47 which extend outwardly therefrom and are pivoted to the rear flattened extremities of the respective turning arms 31, as clearly shown in Fig. 1. It will now be seen that movement of either link 47 will cause an equal movement of the other link 47 but in the opposite direction so that the cultivator blades 39 will be caused to approach or recede according to the direction in which the lever 46 swings.

From the foregoing description, taken in connection with the accompanying drawings, it will be seen that if, for any reason, the cultivator blades at either side should move too close to the plants the clevis 27 will be swung about the vertical axis of the hub member 26 as a center and this movement will be imparted directly to the shank 30 so that the turning arm 31 will be swung to one side following the movement of the cultivator beams. This movement will be at once transmitted through the coupling links 47 and the lever 46 to the other cultivator beams and also to the coupling bar 14 through the pivotal connection of the lever to the bar. The steering arms 9 will, consequently, be swung laterally in the same direction as the cultivator beams and the wheels 7 of the machine will be disposed angularly so as to quickly bring the machine into the proper relation to the row of plants as its travel progresses. It will be understood that the draft of the cultivator beam not subjected to the lateral force tends to keep it in a straight line so that it resists the lateral movement which, consequently, acts upon the coupling bar 14. If, however, lateral force be exerted upon the beams at both sides simultaneously, the lever 46 will rock on the coupling bar 14 without imparting movement thereto and the cultivators will be moved apart or toward each other according to circumstances. The device is very simple in the construction and arrangement of its parts and will operate automatically to maintain the proper operative position of the cultivators.

Having thus described the invention, I claim:

1. The combination with a cultivator frame, of vertical spindles mounted on the sides of the frame, carrying wheels mounted on said spindles, steering arms projecting forwardly from the upper ends of the spindles, a coupling bar extending between and swiveled to the said steering arms, rotatable shanks mounted upon the cultivator frame in advance of the spindles, rocking arms fixed to and extending rearwardly from the upper ends of said shanks under the coupling bar, cultivator beams connected with the lower ends of said shanks whereby lateral movement of the beams will effect rotation of the shanks, a lever pivoted between its ends at the center of the coupling bar and extending forwardly and rearwardly beyond said bar, and links connecting the opposite ends of said lever with the respective rocking arms.

2. The combination of a frame including a draft tongue, a transverse bar resting on the tongue, an arch secured to the under side of the tongue and connected with said bar at the side of the tongue, horizontal spindles extending outwardly from the ends of the arch, sleeves adjustably secured on said spindles and having vertically disposed hub members, sleeves adjustably secured on the transverse bar and having vertical hub members alined axially with the hub members on the respective first-mentioned sleeves, shanks rotatably mounted in the alined hub members, rearwardly projecting arms fixed to the upper extremities of the shanks, equalizing connections between said arms, and cultivators connected with the lower ends of the shanks whereby lateral movement of the cultivators will rotate the shanks.

3. The combination of a frame including a draft tongue and a transverse bar resting on the tongue, an arch secured to the under side of the tongue and connected with said bar at the sides of the tongue, horizontal spindles extending outwardly from the ends of the arch, sleeves adjustably secured on said spindles and having vertically disposed hub members, sleeves adjustably secured on the transverse bar and having vertical hub members aligned axially with the hub members on the respective first-mentioned sleeves, shanks rotatably mounted in the alined hub members, rearwardly projecting arms fixed to the upper extremities of the shanks, equalizing connections between said arms, clevises detachably secured to the shanks above and below the lower hub members to turn with the shanks, and cultivators secured to the clevises.

In testimony whereof I affix my signature.

LYMAN I. ANDREW. [L. S.]